United States Patent
Small

(10) Patent No.: US 9,582,099 B2
(45) Date of Patent: Feb. 28, 2017

(54) SERRATED INPUT SENSING INTERVALS

(71) Applicant: Synaptics Incorporated, San Jose, CA (US)

(72) Inventor: Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 187 days.

(21) Appl. No.: 14/231,445

(22) Filed: Mar. 31, 2014

(65) Prior Publication Data

US 2015/0277650 A1    Oct. 1, 2015

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0412* (2013.01)

(58) Field of Classification Search
CPC ....... G06F 3/0416; G06F 3/044; G06F 3/0412
USPC ............ 178/18.01–19.07; 345/104, 173–178
See application file for complete search history.

(56) References Cited

U.S. PATENT DOCUMENTS

| | | | |
|---|---|---|---|
| 5,093,655 A | 3/1992 | Tanioka et al. | |
| 5,392,058 A | 2/1995 | Tagawa | |
| 5,534,892 A | 7/1996 | Tagawa | |
| 5,896,120 A | 4/1999 | Iguchi et al. | |
| 6,219,113 B1 | 4/2001 | Takahara | |
| 6,239,788 B1 | 5/2001 | Nohno et al. | |
| 6,560,276 B1 | 5/2003 | Long et al. | |
| 7,031,886 B1 | 4/2006 | Hargreaves | |
| 7,451,050 B2 | 11/2008 | Hargreaves | |
| 7,633,566 B2 | 12/2009 | Utsunomiya et al. | |
| 2004/0095336 A1 | 5/2004 | Hong et al. | |
| 2004/0217945 A1 | 11/2004 | Miyamoto et al. | |
| 2005/0135492 A1 | 6/2005 | Jia et al. | |
| 2006/0012575 A1 | 1/2006 | Knapp et al. | |
| 2006/0114247 A1 | 6/2006 | Brown | |
| 2007/0026966 A1 | 2/2007 | Sanchez | |
| 2007/0074914 A1 | 4/2007 | Geaghan et al. | |
| 2007/0262966 A1 | 11/2007 | Nishimura et al. | |
| 2008/0018581 A1 | 1/2008 | Park et al. | |
| 2008/0048989 A1 | 2/2008 | Yoon et al. | |
| 2008/0055267 A1 | 3/2008 | Wu et al. | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0144743 A1 | 6/2008 | Alderson et al. | |
| 2008/0150901 A1 | 6/2008 | Lowles et al. | |
| 2008/0180407 A1 | 7/2008 | Utsunomiya et al. | |

(Continued)

FOREIGN PATENT DOCUMENTS

| | | |
|---|---|---|
| CN | 1940842 A | 4/2007 |
| CN | 101051256 A | 10/2007 |

(Continued)

*Primary Examiner* — Michael Pervan
(74) *Attorney, Agent, or Firm* — Patterson + Sheridan, LLP

(57) ABSTRACT

Embodiments of the present disclosure provide a technique for input sensing using an input device having a display device with an integrated sensing device. Input sensing is performed over a long sensing interval to attain narrow-band filtering, and is temporarily suspended for short intervals (within the long sensing interval) to refresh the row selection logic of the display device.

20 Claims, 5 Drawing Sheets

(56) References Cited

U.S. PATENT DOCUMENTS

| | | |
|---|---|---|
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2009/0009194 A1 | 1/2009 | Seguine |
| 2009/0079707 A1 | 3/2009 | Kaehler et al. |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0042152 A1 | 2/2011 | Wu |
| 2011/0050585 A1 | 3/2011 | Hotelling et al. |
| 2011/0102361 A1 | 5/2011 | Philipp |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |
| 2013/0057511 A1 | 3/2013 | Shepelev et al. |
| 2013/0057512 A1 | 3/2013 | Lillie et al. |
| 2014/0049507 A1 | 2/2014 | Shepelev et al. |
| 2014/0184533 A1* | 7/2014 | Park .................. G06F 3/0412 345/173 |

FOREIGN PATENT DOCUMENTS

| | | |
|---|---|---|
| CN | 1940842 B | 5/2010 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2006106853 A | 4/2006 |
| JP | 2007334606 A | 12/2007 |
| JP | 2008090623 A | 4/2008 |
| JP | 2010072581 A | 4/2010 |
| TW | 200945147 A | 11/2009 |
| WO | WO-0127868 A1 | 4/2001 |
| WO | WO-03019346 A1 | 3/2003 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

* cited by examiner

SERRATED INPUT SENSING INTERVALS

BACKGROUND OF THE INVENTION

Field of the Invention

Embodiments of the present invention generally relate to techniques for reducing display artifacts when resuming display updating in an integrated input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes configured for both updating display lines and transmitting input sensing signals. In such shared electrode configurations, display updating and input sensing may be performed during separate time periods in order to reduce the likelihood of interference between these processes. For example, input sensing may be performed during one or more non-display update periods during which display updating is paused. However, when display updating is paused for an extended period of time to perform input sensing, components that are used to perform display updating may discharge. Consequently, when display updating is resumed after an input sensing period, the voltages across these components may be at lower-than-desired levels, generating display artifacts.

Therefore, there is a need for an improved technique for reducing display artifacts when resuming display updating in an integrated input device.

SUMMARY OF THE INVENTION

Embodiments of the present disclosure generally provide a processing system configured to drive an input device comprising a display device with an integrated sensing device. The processing system includes a driver module having driver circuitry. The driver module is configured to be coupled to a plurality of sensor electrodes configured for capacitive sensing and a plurality of display lines. Each sensor electrode includes at least one common electrode of a plurality of common electrodes configured for display updating and capacitive sensing. The driver module is configured for driving row selection logic of the input device to select a first display line of the plurality of display lines for display updating during a display update period of a first display frame. The driver module is further configured for driving a first sensor electrode of the plurality of sensor electrodes for capacitive sensing during a non-display update period of the first display frame, and driving the row selection logic during a row selection logic refresh period. The row selection logic refresh period occurs within the non-display update period.

Embodiments of the present disclosure may further provide an input device that includes a display device having an integrated sensing device. The input device further includes a plurality of sensor electrodes configured for capacitive sensing, a plurality of display lines coupled to row selection logic, and a processing system configured to be coupled to the plurality of sensor electrodes and the plurality of display lines. The processing system is configured for driving the row selection logic to select a first display line of the plurality of display lines for display updating during a display update period of a first display frame. The processing system is further configured for driving a first sensor electrode of the plurality of sensor electrodes for capacitive sensing during a non-display update period of the first display frame, and driving the row selection logic during a row selection logic refresh period. The row selection logic refresh period occurs within the non-display update period.

Embodiments of the present disclosure may further provide a method of input sensing with a display device integrated with a sensing device. The display device integrated with the sensing device includes a plurality of display lines coupled to row selection logic and a plurality of sensor electrodes. The method includes driving row selection logic of the display device to select a first display line of the plurality of display lines for display updating during a display update period of a first display frame. The method further includes driving a first sensor electrode of the plurality of sensor electrodes for capacitive sensing during a non-display update period of the first display frame, and driving the row selection logic during a row selection logic refresh period. The row selection logic refresh period occurs within the non-display update period.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure generally provide a system and method for reducing display artifacts when resuming display updating in an integrated input device. During operation of an integrated input device, display updating may be paused in order to perform input sensing and/or other processes during one or more non-display update periods, causing certain electrical elements in the display device's row selection logic to discharge during the non-display update period(s). In order to refresh these electrical elements to the desired levels prior to resuming display updating, input sensing may be temporarily suspending during the non-display update period(s) for a short interval to drive the row selection logic of the display device. Accordingly, during a row selection logic refresh period that occurs within a non-display update period, the row selection logic may be driven with one or more clock signals before internal electrical elements can fall to unacceptable levels, thereby reducing the incidence of display artifacts.

Figure 1:
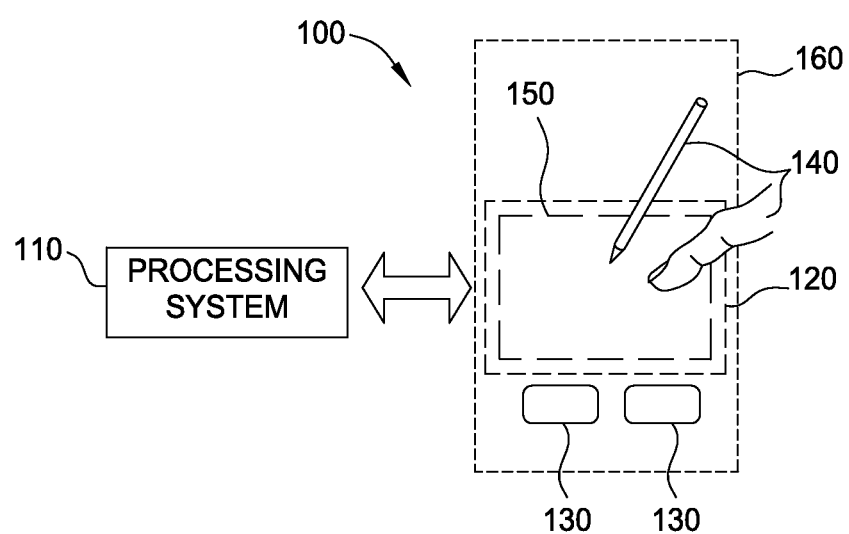
FIG. 1 is a block diagram of an exemplary input device in accordance with embodiments of the present disclosure.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 150 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source driver lines, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), micro electromechanical systems (MEMS), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
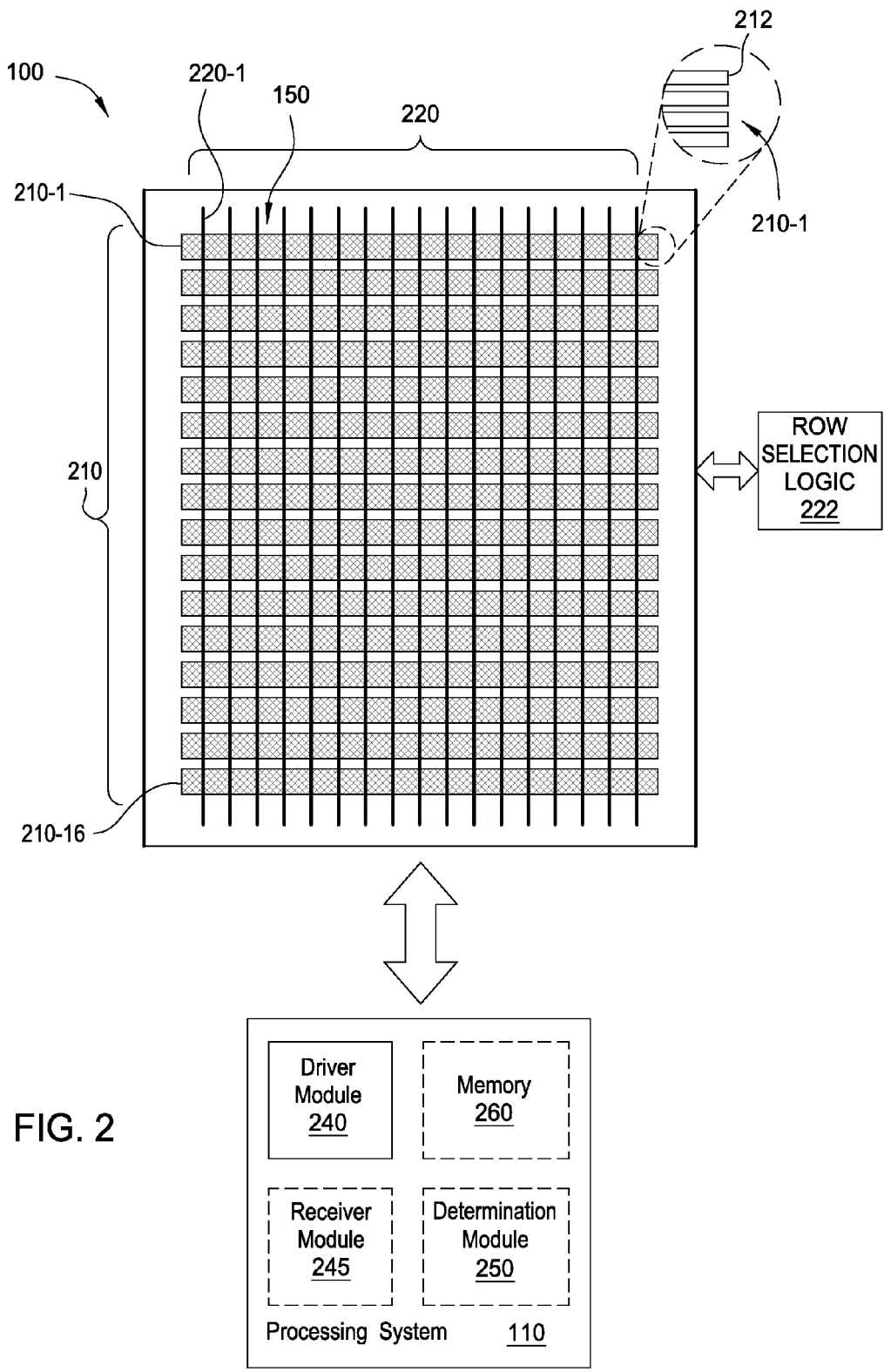
FIG. 2 is a partial schematic plan view of the input device of FIG. 1 in accordance with embodiments of the present disclosure.

FIG. 2 is a partial schematic plan view of the input device 100 of FIG. 1 in accordance with embodiments of the invention. The input device 100 includes an array of sensing elements 150 and processing system 110. The array of sensing elements 150 includes a first plurality of sensor electrodes 210 (e.g., 210-1, 210-2, 210-3, etc.) and a second plurality of sensor electrodes 220 (e.g., 220-1, 220-2, 220-3, etc.). Each sensor electrode of the first plurality of sensor electrodes 210 may comprise one or more common electrodes 212. Additionally, in various embodiments, each sensor electrode of the second plurality of sensor electrodes 220 may comprise one or more common electrodes. The processing system 110 is coupled to the array of sensing elements 150, for example, through one or more routing traces (not shown in FIG. 2).

Processing system 110 is configured to operate the first and second plurality of sensor electrodes for input sensing. For example, processing system 110 is configured to operate the first plurality of sensor electrodes as transmitter electrodes by driving the first plurality of sensor electrodes with transmitter signals and operate the second plurality of sensor electrodes as receive electrodes by receiving resulting signals with the second plurality of sensor electrodes. Further, processing system 110 is configured to operate the first plurality of sensor electrodes and the second plurality of sensor electrodes for absolute capacitive sensing by driving a modulated signal onto the first and second plurality of sensor electrodes and receiving resulting signals with the sensor electrodes of the first and second plurality of sensor electrodes.

Although the processing system 110 is illustrated in FIG. 2 embodied as a single integrated circuit (IC), the input device 100 may include any appropriate number of ICs comprising the processing system 110. In one embodiment, the processing system 110 may include a driver module 240 having driver circuitry and configured to be coupled to the plurality of sensor electrodes 210, 220 and to a plurality of display lines of the input device 100. Optionally, the processing system 110 may further include a receiver module 245, a determination module 250, a memory 260, and/or a synchronization mechanism (not shown in FIG. 2).

The driver module 240 is configured to drive sensor electrodes 210, 220 for capacitive sensing and drive elements of the display device 160 for display updating during various times and for various durations as described herein. While the driver module 240 is depicted in FIG. 1 as a single logical entity within the processing system 110, other configurations and arrangements may be used, including multiple logical components internal to and/or external to the processing system. 110. For example, the driver module 240 may represent a first driver portion configured to perform the display updating functions and a second driver portion configured to perform the capacitive sensing functions, where the first and second driver portions are in separate units (e.g., separate ASICs).

The driver module 240 may be configured for updating images on the display screen of the display device 160. For example, the driver circuitry of the driver module 240 may be configured to apply one or more pixel voltages to the display pixel electrodes through pixel source drivers. The driver circuitry may also be configured to apply one or more common drive voltages to the common electrodes 212 to update one or more display lines of the display screen. In addition, the processing system 110 is configured to operate the common electrodes 212 as transmitter electrodes for input sensing by driving transmitter signals onto the common electrodes 212.

In one or more embodiments, the input device 100 may include row selection logic 222 for selecting display lines of the display device 160 for updating. As described in greater detail below, the row selection logic 222 may be further configured to generate non-display update periods with the input device 100 for performing input sensing. The row selection logic 222, sometimes referred to as gate-in-panel logic (GIP), may include a dynamic shift register and logic gates coupled to gate select lines associated with each display line of the display device 160. The shift register and logic gates may be in communication with a plurality of control lines, such as a start line and clock lines, coupled to the processing system 110 and configured to clock a token through the row selection logic 222.

The driver module 240 may be configured to drive clock signals on the control lines to control the pulse width of the select signal outputted to each gate select line. For example, the clock signals may have a period substantially equal to the time period of one display line update, or substantially equal to a multiple of the display line update time period, thought it should be recognized that each active portion of a clock signal may be less than the time period of one display line update. The driver module 240 may be configured to drive the row selection logic 222 to generate non-display update periods and row selection logic refresh periods, as described below in further detail with respect to FIG. 4B.

Although the techniques are described herein with respect to specific types of logic elements (e.g., a shift register including AND gates and flip-flops), these techniques may be implemented with other types of transistors, gates, latches, registers, etc. having similar or equivalent configurations. The row selection logic 222 may be disposed on any appropriate layer or substrate of the input device 100. For example, in various embodiments, the row selection logic 222 may be fabricated on a thin-film transistor (TFT) layer of the display device 160. Further, the row selection logic 222 may be interleaved on one edge of a layer of the display device 160, or the row selection logic 222 may be disposed on two or more edges (e.g., two opposing edges) and interleaved between the two or more edges.

The receiver module 245 is coupled to the second plurality of sensor electrodes 210 and configured to receive resulting signals from the second plurality of sensor electrodes 210 indicative of input (or lack of input) in the sensing region 120 and/or of environmental interference. The receiver module 245 may also be configured to pass the resulting signals to the determination module 250 for determining the presence of an input object and/or to the optional memory 260 for storage.

The functions of the processing system 110 may be implemented in more than one IC to control the display module elements (e.g., common electrodes 212) and drive transmitter signals and/or receive resulting signals received from the array of sensing elements 150. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

In various embodiments, the first plurality of sensor electrodes 210 and the second plurality of sensor electrodes 220 are ohmically isolated from each other by one or more insulators which separate the first plurality of sensor electrodes 210 and the second plurality of sensor electrodes 220 and prevent them from electrically shorting to each other. The electrically insulative material separates the first plurality of sensor electrodes 210 and the second plurality of sensor electrodes 220 at cross-over areas at which the electrodes intersect. In one such configuration, the first plurality of sensor electrodes 210 and the second plurality of sensor electrodes 220 are formed with jumpers connecting different portions of the same electrode. In other configurations, the first plurality of sensor electrodes 210 and the second plurality of sensor electrodes 220 are separated by one or more layers of electrically insulative material or by one or more substrates, as described in further detail below. In still other configurations, the first plurality of sensor electrodes 210 and the second plurality of sensor electrodes 220 are optionally disposed on a single layer of the input device 100. In yet other configurations, the first and second plurality of sensor electrodes may be disposed in a matrix. A matrix sensor electrode arrangement may comprise a plurality of zero-dimensional input areas, where each zero-dimensional input area may correspond to a single sensor electrode of the first or second pluralities of sensor electrodes or multiple sensor electrodes from one or both of the first and second pluralities of sensor electrodes. In any of the above configurations, one or more of the sensor electrodes may be configured to operate as a shield electrode to shield and/or guard other sensor electrodes.

The areas of localized capacitive coupling between first plurality of sensor electrodes 210 and the second plurality of sensor electrodes 220 may be termed "capacitive pixels." Further, in some embodiments, the area areas of localized capacitive coupling between the first plurality of sensor electrodes 210, the second plurality of sensor electrodes 220 and an input object may be termed "capacitive pixels." The capacitive coupling between the first plurality of sensor electrodes 210 and the second plurality of sensor electrodes 210 changes with the proximity and motion of input objects in the sensing region 120 associated with the first plurality of sensor electrodes 210 and the second plurality of sensor electrodes 210.

In some embodiments, the sensor pattern is "scanned" to determine these capacitive couplings. That is, the first plurality of sensor electrodes 210 are driven to transmit transmitter signals. Transmitters may be operated such that one sensor electrode included in the first plurality of sensor electrodes 210 transmits at one time, or multiple sensor electrodes included in the first plurality of sensor electrodes 210 transmit at the same time. Where multiple sensor electrodes included in the first plurality of sensor electrodes 210 transmit simultaneously, these multiple sensor electrodes may transmit the same transmitter signal and effectively produce an effectively larger sensor electrodes, or these multiple sensor electrodes may transmit different transmitter signals. For example, multiple sensor electrodes included in the first plurality of sensor electrodes 210 may transmit different transmitter signals according to one or more coding schemes that enable their combined effects on the resulting signals of the second plurality of sensor electrodes 210 to be independently determined.

The second plurality of sensor electrodes 210 may be operated singly or multiply to acquire resulting signals. The resulting signals may be used to determine measurements of the capacitive couplings at the capacitive pixels.

In other embodiments, the first plurality of sensor electrodes 210 and the second plurality of sensor electrodes 220 may be driven with modulated signals and receive resulting signals to measure changes in absolute capacitive between the first and second pluralities of sensor electrodes to determine the capacitive pixels. The sensor electrodes may be driven all at the same time or scanned such that only a portion of the sensor electrodes are driven and received with at the same time.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Input Sensing During Non-Display Update Periods

In various embodiments, the common electrodes and/or other display elements (e.g., gate select lines, source lines, storage capacitors, etc.) may be used both to update the display and to perform input sensing. In order to reduce the likelihood of interference between these processes, display updating and input sensing may be performed during separate time periods. In other embodiments, dedicated sensor electrodes may be used to perform input sensing in a manner that coordinates with the common electrodes and/or other display elements that are used to update the display. In such embodiments, interference may also occur between the input sensing system and the display updating system, and it may be desirable to separate the operation of the input sensing and display updating into separate time intervals.

In one or more embodiments, input sensing may be performed during non-display update periods (e.g., sensing periods, input sensing periods or capacitive sensing periods) referred to as "blanking" periods or "distributed blanking" periods. These non-display update periods, also referred to as horizontal-blanking periods, long horizontal-blanking ("long h-blank") periods, vertical-blanking periods, in-frame blanking periods, etc., occur between display line and/or display frame updates. For example, a horizontal-blanking period may refer to the non-display update period that occurs after updating display line N, but before updating display line N+1, during which the display elements may be altered to update display line N+1. Additionally, if a video signal transmitted to the display device 160 is field-interlaced, input sensing may be performed between successive fields. Further, a long horizontal-blanking period may be generated by redistributing multiple horizontal-blanking periods, at least a portion of the vertical blanking periods, or some combination of the two, and combining the periods into a single non-display update period. For example, a long horizontal-blanking period may be generated by removing the non-display update periods that may occur between multiple display line updates and combining the non-display update periods into a single non-display update period. In one embodiment, a long horizontal-blanking period (or a sensing period) may be a non-display update period that is at least as long as the duration of a display line update period. In another embodiment, a long horizontal-blanking period may be a non-display update period (or a sensing period) that is longer than the duration of a display line update period.

Figure 3:
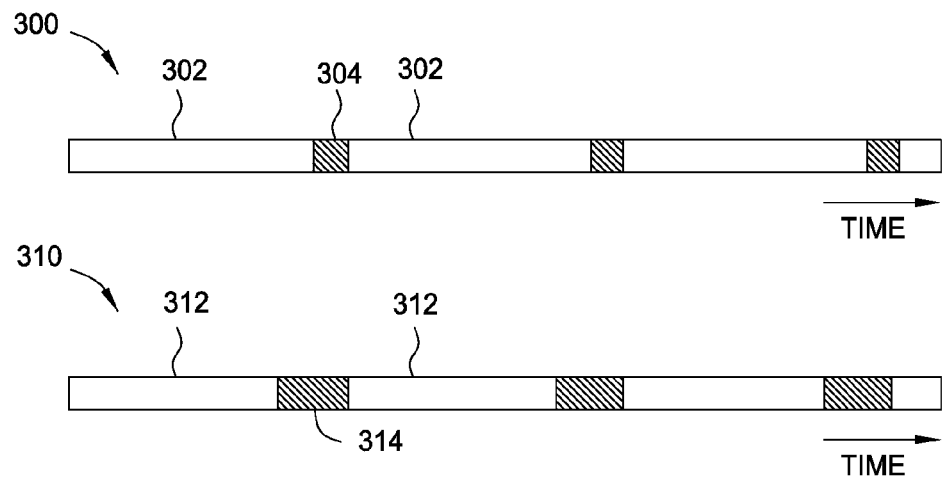
FIG. 3 illustrates techniques for driving select lines and source lines of the input device during display update periods and performing input sensing during a non-display update period, in accordance with embodiments of the present disclosure.

As an example, FIG. 3 is a block diagram depicting timing schemes 300, 310 for input sensing during non-display update periods. As shown in the timing scheme 300, input sensing may be performed during a plurality of non-display update periods 304 that occur between display line updates and/or display frame updates, represented by display update periods 302.

Sensing periods may be implemented with various types of display devices. For example, fast-switching transistor displays enable display lines to be selected and updated relatively quickly, allowing display updating to be stopped to perform input sensing and subsequently resumed in an efficient manner. In contrast, slow-switching transistor displays may experience a time delay between the time at which a display line is selected and the time at which the corresponding row of transistors reaches a sufficient level (e.g., $V_{on}$) to receive pixel data. In one embodiment, a slow-switching transistor is any type of transistor that, when utilized in a gate select line for a display line, does not rapidly conduct or "activate" when the source lines are driven to update the display line. One exemplary type of slow-switching transistor is an amorphous silicon or an "a-Si" transistor. One exemplary type of fast-switching transistor is a low-temperature polycrystalline silicon (LTPS) transistor. In some embodiments, a fast-switching transistor in one display device may be considered a slow-switching transistor in another display device.

To compensate for switching delays and enable slow-switching devices to perform at a desired resolution and refresh rate, such devices may use a technique referred to as "pipelining," in which several consecutive gate select lines are driven in an overlapping manner. That is, the gate select lines may be driven with a gate select signal in a sequential and overlapping manner such that that the transistors corresponding to the display lines reach an "on" state at different times, enabling each display line to be separately updated (e.g., via source lines) in a timely manner. The pipelining technique described above may be implemented using a variety of different hardware and/or software configurations. For example, in various embodiments, pipelining may be accomplished by pre-charging a register element associated with a next gate select line (e.g., line i+1) while another register element associated with a current gate select line (e.g., line i) is being driven to select a display line for updating.

Regardless of whether fast-switching transistors or slow-switching transistors are used in a display device, interrupting display updating (to perform input sensing) for long periods of time may affect the final voltage applied to gate select lines and cause display artifacts when display updating is resumed. For example, as shown in FIG. 3, the timing scheme 310 includes a plurality of display update periods 312 interleaved with a plurality of non-display update periods 314, which have a longer duration than the non-display update periods 304 of the timing scheme 300.

During the non-display update period 314, electrical nodes (e.g., register elements) of row selection logic 222 may slowly discharge (e.g., due to leakage), causing the voltage across the electrical nodes to be at a lower-than-desired level once display updating resumes at the start of the next display update period 312. As a result, the electrical nodes of the row selection logic 222 may not reach the threshold voltage (i.e., $V_{ON}$), or may remain above the threshold voltage for an insufficient duration of time to turn on gates of a next selected row or rows of pixels. Consequently, once display updating is resumed in the display update period 312, the next row of pixels, or several rows of pixels, to be updated may not store the desired voltage on their pixels, causing display artifacts, such as a small but abrupt change in brightness that is correlated with the display lines. Accordingly, to avoid the above-mentioned display artifacts when resuming display updating after the non-display update period, input sensing is performed over a long interval to facilitate a desired narrow-band filtering but is temporarily suspended for short intervals within this long interval to refresh the row selection logic, as described below in further detail in conjunction with FIGS. 4A-4B and 5.

Reducing Display Artifacts when Resuming Display Updating

Figure 4A:
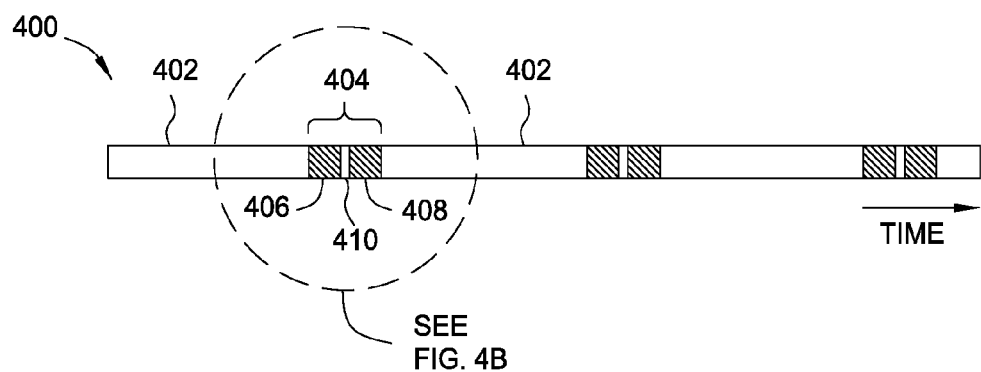
FIG. 4A illustrates a technique for driving select lines and source lines of the input device during display update periods and performing input sensing during a non-display update period, in accordance with embodiments of the present disclosure.

FIG. 4A is a block diagram depicting a timing scheme 400 for input sensing during non-display update periods, according to embodiments of the present disclosure. As shown in the timing scheme 400, input sensing may be performed during a plurality of sensing intervals 404 that occur between display line updates and/or display frame updates, represented by display update periods 402. Each sensing interval 404 includes a plurality of non-display update periods 406, 408. Taken together, non-display update periods 406, 408 of sensing interval 404 provide an interval longer in duration than a conventional non-display update period (e.g., 304) and enables filtering of any resulting signals to be made narrow-band in order to reject more noise in the resulting signals.

In one embodiment, the input sensing performed during non-display update periods 406, 408 is temporarily suspended for a short interval, referred herein as a row selection logic refresh period 410, without significantly affecting the bandwidth or quality of the filter. During each row selection logic refresh period 410, one display lines or a few display lines of the display device 160 may be updated, which has a side-effect of recharging the electrical nodes within the row selection logic and preventing these nodes from falling to lower-than-desired levels. In one or more embodiments, the row selection logic refresh period 410 may be characterized as a "notch" within a "serrated" sensing interval 404. The row selection logic refresh period 410 may have a duration shorter than the display update period 402 and occurs within the sensing interval 404. In one example, the display updating period for the input device 100 may allot about 8 µs per display line. If the durations of the sensing interval 404 are expressed as a multiple of the display line time, the sensing interval 404 may have a duration of about 40 to 50 multiples of the display line time (e.g., 200-300 µs), and the row selection logic refresh period 410 may have a duration of about 2-4 multiples of the display line time (e.g., 16 µs). Input sensing and display updating performed during the sensing interval 404 is depicted in greater detail in FIG. 4B.

In embodiments where the input device 100 uses a small number of sensor electrodes (e.g., 210) as transmitters, or even just one transmitter, only a few sensing intervals 404 per display frame may be needed for performing input sensing. Thus, even though the sensing intervals 404 are lengthened, the sensing intervals 404 still do not consume too much of the time that is available for display updating (e.g., display update periods 402). The technique described herein may be used with a variety of arrangements of sensor electrodes, including transmitter electrodes (i.e., common electrodes) and receiver electrodes arranged in a row and column configuration, and sensor electrodes arranged in a matrix. While the sensing interval 404 in FIG. 4A is shown having two non-display update periods 406, 408 interrupted by a single row selection logic refresh period 410, it should be noted that each sensing interval may include additional non-display update periods and row selection logic refresh periods. Further, the non-display update periods in a sensing interval may be equal or not equal in duration, and row selection logic refresh periods may be distributed uniformly or non-uniformly within the sensing interval.

Figure 4B:
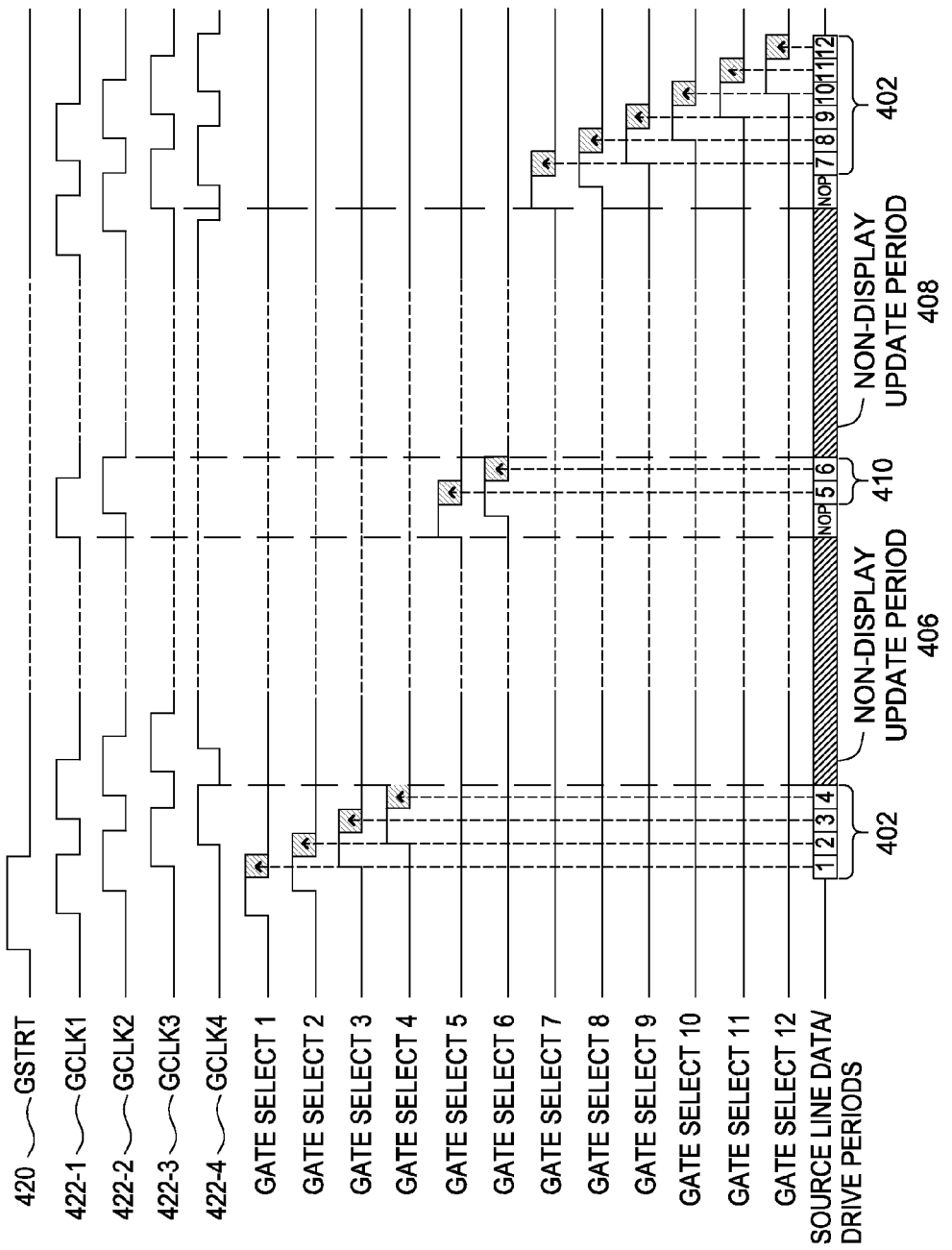
FIG. 4B illustrates waveforms of row selection logic during display update periods and non-display update periods, in accordance with embodiments of the present disclosure.

FIG. 4B illustrates waveforms of the row selection logic 222 during display update periods and non-display update periods in accordance with embodiments of the present disclosure. As shown in FIG. 4B, a start signal may be asserted on a start line 420. Clock signals then may be asserted on clock lines 422-1, 422-2, 422-3, etc. in order to clock a token through the row selection logic 222 and drive select signals to the gate select lines in a pipelined manner. While the transistors associated with each gate select line reach $V_{ON}$, source line data (e.g., pixel data) for the corresponding display line is driven to the source lines. When the transistors associated with each gate select line turn off, the source line voltages that were applied to the pixels through the transistors may be then stored on the pixels. Source line data may be driven in a sequential manner (e.g., display line 1, display line 2, etc.), as shown in FIG. 4B. After pixel data for display line 4 has been driven to the source lines, gate select line 4 may be deselected, and the token may be held within the row selection logic 222 during the first non-display update period 406.

In one embodiment, when the token is held by the row selection logic 222, no select lines are enabled, and input sensing may be performed. After the non-display update period 406, the input sensing is interrupted for one display line or a few display lines to be updated during the row selection logic refresh period 410. Because the non-display update period 406 is thereby shortened, voltages within the row selection logic 222 do not discharge enough to cause visible artifacts. As shown, a clock signal may be asserted on clock lines 422-1, 422-2, etc. and the token may be clocked through the row selection logic 222 to drive gate select lines associated with display lines 5-6. Clocking the row selection logic 222 refreshes electrical nodes within the row selection logic and prevents the electrical nodes from leaking charge to lower-than-desired levels during the long sensing interval 404.

After pixel data for display line 6 has been driven to the source lines, gate select line 6 may be deselected, and the token may be held again within the row selection logic 222 during the second non-display update period 408, during which input sensing is resumed. After the second non-display update period 408 (e.g., after input sensing is complete), a clock signal may be asserted on clock line 422-3 and the token may be clocked through the row selection logic 222 to drive gate select lines associated with display lines 7-12.

In some embodiments, during row selection logic refresh period 410, clock signals may be asserted on clock lines 422-1, 422-2, etc., and the token may be clocked through the row selection logic 222, but without driving any gate select lines associated with display lines. Rather, clock signals are asserted to refresh the row selection logic 222, and then quickly resume input sensing during the second non-display update period 408

In some embodiments, for example, in embodiments without "dummy" stages within row selection logic 222 that maintain the level of the token during input sensing, clock signals representing a "restart" sequence (depicted as "NOP" in FIG. 4B) may be asserted on the clock lines during the row selection logic refresh period 410. During such a restart sequence, clock signals may be asserted on the clock lines to first clock the token in a backwards direction through the row selection logic 222 to use "pipelined" stages within the row selection logic to "pre-charge" electrical elements that drive gate select lines associated with display lines 5-6. Clock signals may then be asserted on the clock lines to clock the token forward through the row selection logic 222 and drive the gate select lines associated with display lines 5-6.

Although the waveforms and techniques applied to row selection logic 222 in FIG. 4B is described with respect to a slow-switching display device, the configurations and techniques described above also may be implemented with other display types (e.g., fast-switching display devices).

Figure 5:
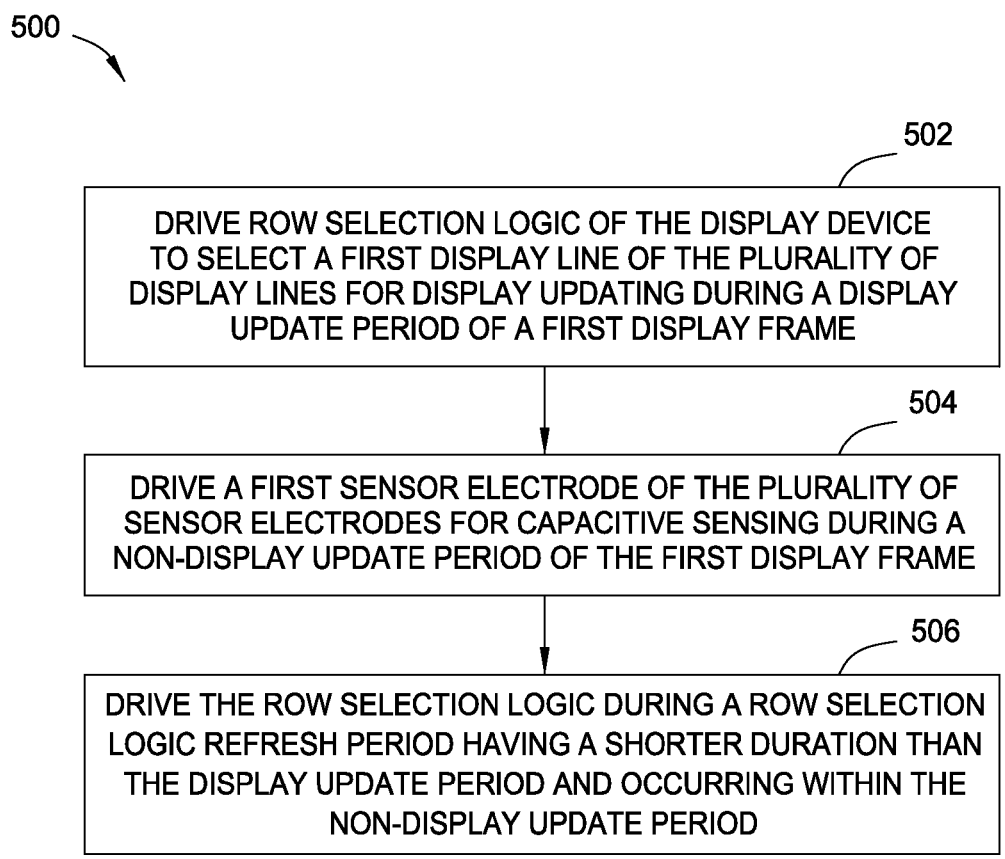
FIG. 5 is a flow chart of a method for reducing display artifacts when resuming display updating with the input device, in accordance with embodiments of the present disclosure.

FIG. 5 is a flow chart of a method 500 for input sensing with the input device, such as input device 100, in accordance with embodiments of the present disclosure. Although the method 500 is described in conjunction with FIGS. 1-4, persons skilled in the art will understand that any system configured to perform the method, in any appropriate order, falls within the scope of the present disclosure.

The method 500 begins at step 502, where the driver module 240 drives row selection logic of the input device to select a first display line of the plurality of display lines for display updating during a display update period of a first display frame. In some embodiments, the driver module 240 may drive at least one common electrode of the plurality of common electrodes to update the first display line during the display update period. In some embodiments, each first display frame may include a plurality of non-display update periods. In some embodiments, the non-display update period is sub-divided by the row selection logic refresh period into a plurality of non-display update periods, for example, a first non-display update period and a second non-display update period.

At step 504, the driver module 240 drives a first sensor electrode of the plurality of sensor electrodes for capacitive sensing during a non-display update period of the first display frame. In some embodiments, the plurality of sensor electrodes may include a plurality of transmitter electrodes and a plurality of receiver electrodes arranged in a row and column configuration, wherein at least one of the transmitter electrodes comprises a common electrode. In other embodiments, the plurality of sensor electrodes may be the plurality of common electrodes arranged in a matrix.

At step 506, the driver module 240 drives the row selection logic during a row selection logic refresh period occurring within the non-display update period. In some embodiments, the row selection logic refresh period may have a shorter duration than the display update period. In one embodiment, the driver module 240 may update the row selection logic based on a clock signal without driving the plurality of display lines for display updating. Alternatively, the driver module 240 may update the row selection logic based on a clock signal, and drive a second display line of the plurality of display lines for display updating during the row selection logic refresh period. In some embodiments, to refresh the row selection logic without driving the plurality of display lines for display updating, the display driver may update row selection logic having at least one dummy stage configured to share charge with a gate selection stage, which is configured to select at least one display line for display updating.

Accordingly, the techniques described herein enable the processing system to use non-display update periods, such as a long horizontal-blanking period, of an arbitrary duration for input sensing. This, in turn, allows the processing system to allocate longer time period for each transmitter slot, improving input performance. Longer transmitter slots also allow for more narrow-band filtering of the received resulting signals, thereby providing noise rejection.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system configured to drive an input device comprising a display device with an integrated sensing device, the processing system comprising:
   a driver module comprising driver circuitry, wherein the driver module is configured to be coupled to a plurality of sensor electrodes and a plurality of display lines, wherein each sensor electrode comprising at least one common electrode of a plurality of common electrodes configured for display updating and capacitive sensing, wherein the driver module is configured for:
      driving row selection logic of the input device to select a first display line of the plurality of display lines for display updating during a display update period of a first display frame;
      driving a first sensor electrode of the plurality of sensor electrodes for capacitive sensing during a non-display update period of the first display frame; and
      driving the row selection logic during a row selection logic refresh period for display updating, wherein the row selection logic refresh period occurs within the non-display update period.

2. The processing system of claim 1, wherein the driver module is further configured for:
   driving at least one common electrode of the plurality of common electrodes to update the first display line during the display update period.

3. The processing system of claim 1, wherein driving the row selection logic during the row selection logic refresh period comprises:
   updating the row selection logic based on a clock signal without driving the plurality of display lines for display updating.

4. The processing system of claim 1, wherein the row selection logic comprises at least one dummy stage configured to share charge with a gate selection stage, wherein the gate selection stage is configured to select at least one display line for display updating.

5. The processing system of claim 1, wherein driving the row selection logic during the row selection logic refresh period comprises:
   updating the row selection logic based on a clock signal; and
   driving a second display line of the plurality of display lines for display updating during the row selection logic refresh period.

6. The processing system of claim 1, wherein the plurality of sensor electrodes comprises a plurality of transmitter electrodes and a plurality of receiver electrodes arranged in a row and column configuration, wherein at least one of the transmitter electrodes comprises a common electrode.

7. The processing system of claim 1, wherein the plurality of sensor electrodes comprises the plurality of common electrodes arranged in a matrix.

8. The processing system of claim 1, wherein the first display frame comprises a plurality of non-display update periods.

9. The processing system of claim 1, wherein the non-display update period is sub-divided by the row selection logic refresh period into a first non-display update period and a second non-display update period, wherein the row selection logic refresh period has a shorter duration than the display update period.

10. An input device comprising a display device having a sensing device, the input device further comprising:
   a plurality of sensor electrodes configured for capacitive sensing;
   a plurality of display lines coupled to row selection logic;
   a processing system configured to be coupled to the plurality of sensor electrodes and the plurality of display lines, the processing system configured for:
      driving the row selection logic to select a first display line of the plurality of display lines for display updating during a display update period of a first display frame;
      driving a first sensor electrode of the plurality of sensor electrodes for capacitive sensing during a non-display update period of the first display frame; and
      driving the row selection logic during a row selection logic refresh period for display updating, wherein the row selection logic refresh period occurs within the non-display update period.

11. The input device of claim 10, wherein driving the row selection logic during the row selection logic refresh period comprises:
   updating the row selection logic based on a clock signal without driving the plurality of display lines for display updating.

12. The input device of claim 10, wherein driving the row selection logic during the row selection logic refresh period comprises:
   updating the row selection logic based on a clock signal; and
   driving a second display line of the plurality of display lines for display updating during the row selection logic refresh period.

13. The input device of claim 10, wherein the row selection logic comprises at least one dummy stage configured to share charge with a gate selection stage, wherein the gate selection stage is configured to select at least one display line for display updating.

14. The input device of claim 10, wherein the plurality of sensor electrodes comprises a plurality of transmitter electrodes and a plurality of receiver electrodes arranged in a row and column configuration, wherein at least one of the plurality of sensor electrodes comprises a common electrode configured for display updating and capacitive sensing.

15. The input device of claim 10, wherein the plurality of sensor electrodes comprises a plurality of common electrodes arranged in a matrix, wherein the plurality of common electrodes are configured for display updating and capacitive sensing.

16. The input device of claim 10, wherein the non-display update period is sub-divided by the row selection logic refresh period into a first non-display update period and a second non-display update period, wherein the row selection logic refresh period has a shorter duration than the display update period.

17. A method of input sensing with a display device integrated with a sensing device having a plurality of display lines coupled to row selection logic, a plurality of sensor electrodes, the method comprising:
   driving row selection logic of the display device to select a first display line of the plurality of display lines for display updating during a display update period of a first display frame;
   driving a first sensor electrode of the plurality of sensor electrodes for capacitive sensing during a non-display update period of the first display frame; and
   driving the row selection logic during a row selection logic refresh period for display updating, wherein the row selection logic refresh period occurs within the non-display update period.

18. The method of claim 17, wherein each sensor electrodes comprises one or more common electrodes configured for display update and capacitive sensing, the method further comprising:
   driving at least one common electrode to update the first display line during the display update period.

19. The method of claim 17, wherein driving the row selection logic during the row selection logic refresh period comprises:
   updating the row selection logic based on a clock signal without driving the plurality of display lines for display updating, wherein the row selection logic comprises at least one dummy stage configured to share charge with a gate selection stage, wherein the gate selection stage is configured to select at least one display line for display updating.

20. The method of claim 17, wherein driving the row selection logic during the row selection logic refresh period comprises:
   updating the row selection logic based on a clock signal; and
   driving a second display line of the plurality of display lines for display updating during the row selection logic refresh period.

* * * * *